US010902464B2

(12) United States Patent
Sriharsha et al.

(10) Patent No.: US 10,902,464 B2
(45) Date of Patent: Jan. 26, 2021

(54) SPARK SATELLITE CLUSTERS TO HADOOP DATA STORES

(71) Applicant: Yahoo Holdings, Inc., Sunnyvale, CA (US)

(72) Inventors: Ram Sriharsha, Sunnyvale, CA (US); Tim Tully, Sunnyvale, CA (US); Supreeth Rao, Sunnyvale, CA (US); Reynold Xin, Sunnyvale, CA (US)

(73) Assignee: Verizon Media Inc., New York, NY (US)

( * ) Notice: Subject to any disclaimer, the term of this patent is extended or adjusted under 35 U.S.C. 154(b) by 1104 days.

(21) Appl. No.: 14/470,704

(22) Filed: Aug. 27, 2014

(65) Prior Publication Data

US 2015/0066646 A1 Mar. 5, 2015

Related U.S. Application Data

(60) Provisional application No. 61/870,641, filed on Aug. 27, 2013.

(51) Int. Cl.
*G06Q 30/02* (2012.01)

(52) U.S. Cl.
CPC .................. *G06Q 30/0256* (2013.01)

(58) Field of Classification Search
CPC ........... G06F 17/30867; G06F 12/0808; G06F 9/5055; G06F 9/5083; G06Q 30/02; G06Q 30/0269; G06Q 30/0273; G06Q 30/0207–0277; G06Q 30/0256; H04L 41/12; H04L 41/509; H04L 43/08; H04L 41/0813; H04L 41/0869; H04L 41/50; H04L 43/10; H04L 41/5041; H04L 61/1511; H04L 67/2842; H04L 41/0816; H04L 41/0893; H04L 47/70;
(Continued)

(56) References Cited

U.S. PATENT DOCUMENTS

2011/0191361 A1* 8/2011 Gupta ............... G06F 17/30424
707/763
2011/0313973 A1* 12/2011 Srivas ............... G06F 17/30194
707/634
(Continued)

OTHER PUBLICATIONS

Zaharia et. al., "Spark: Cluster Computing with Working Sets" published in Jun. 2010.*
(Continued)

*Primary Examiner* — Chinyere Mpamugo
(74) *Attorney, Agent, or Firm* — Cooper Legal Group, LLC

(57) ABSTRACT

An advertising and data analysis platform may need to mine through vast amounts of data to come up with insights into advertising effectiveness, and measure and improve the effectiveness of advertising reach. Distributed network data analytics may be applied to ad matching/targeting, such that an in-memory cluster computing environment may be used with advertising data. For example, HADOOP may be utilized for distributed processing of the vast amounts of data and the HADOOP distributed file system (HDFS) is used for organizing communications and storage of that data. Satellite clusters or nodes may be generated that also utilize HDFS. For example, a SPARK or SHARK satellite cluster may be arranged to further utilize the HDFS of the HADOOP clusters.

20 Claims, 6 Drawing Sheets

(58) Field of Classification Search
CPC ............ H04L 61/1535; H04L 61/6009; H04L 65/403; H04L 65/60; H04L 67/2885
See application file for complete search history.

(56) References Cited

U.S. PATENT DOCUMENTS

| | | | | |
|---|---|---|---|---|
| 2013/0024479 | A1* | 1/2013 | Gong | G06F 9/5066 707/798 |
| 2013/0282668 | A1* | 10/2013 | Hsieh | G06F 16/182 707/691 |
| 2014/0059552 | A1* | 2/2014 | Cunningham | G09G 5/00 718/102 |
| 2015/0032759 | A1* | 1/2015 | Lee | G06F 16/285 707/741 |

OTHER PUBLICATIONS

Das, Tathagata, "Spark Streaming, Large-Scale Near-Real Time Stream Processing," O'Reilly® Strata Conference Making Data Work, Feb. 26-28, 2013, Santa Clara, CA (strataconf.com) (40 pp.).

Sriharsha, Ram, "Shark on Audience Data Warehouse," PowerPoint Presentation, May 19, 2013 (13 pp.).

Xin, Reynold, "Spark and Shark: High-Speed In-Memory Analytics Over Hadoop Data," AmpLab, UC Berkeley, May 14, 2013 @ Oracle, (58 pp.).

Xin, Reynold S. et al., "Shark: SQL and Rich Analytics at Scale," AMPLab, EECS, UC Berkeley (12 pp.).

Zaharia, Matei et al., "Fast and Interactive Analytics Over Hadoop Data With Spark," Aug. 2012 (7 pp.).

Zaharia, Matei et al., "Spark and Shark: High-Speed In-Memory Analytics Over Hadoop and Hive Data," undated, (36 pp.).

* cited by examiner

SPARK SATELLITE CLUSTERS TO HADOOP DATA STORES

PRIORITY

This application claims priority to Provisional Application No. 61/870,641 filed on Aug. 27, 2013, entitled "SPARK SATELLITE CLUSTERS TO HADOOP DATA STORES" the entire disclosure of which is herein incorporated by reference.

BACKGROUND

Online advertising may be an important source of revenue for enterprises engaged in electronic commerce. Processes associated with technologies such as Hypertext Markup Language ("HTML") and Hypertext Transfer Protocol ("HTTP") enable a web page to be configured to display advertisements ("ads"). Ads may commonly be found on many web sites. Web site publishers, such as news and sports web sites, may provide space for ads, referred to as ad slots or ad containers. The publishers of these web sites may sell advertising space to advertisers to defray the costs associated with operating the web sites as well as to obtain additional revenue. Electronic commerce ("ecommerce") sites may include advertisements that are targeted to users based on those products that the user is searching for. The product searches may be conducted in a search engine (e.g. www.yahoo.com) or on a specific ecommerce site. In order to match ads to particular users, there may be a massive amount of data that is stored and analyzed. Quickly and accurately analyzing the large amount may be difficult but necessary for properly identifying users and targeting ads to those users.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

DETAILED DESCRIPTION

Figure 1:
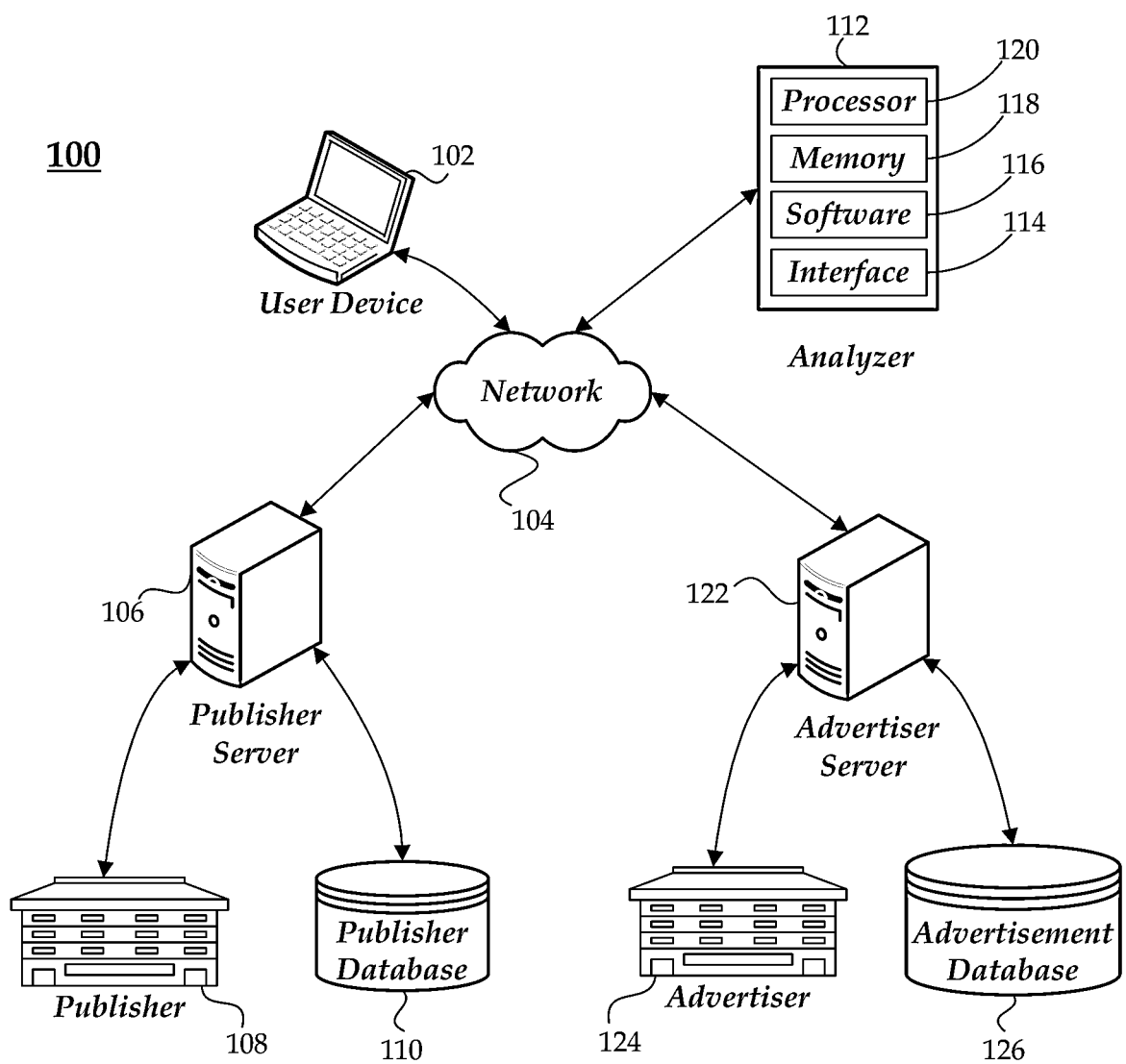
FIG. 1 is a diagram of an exemplary network system.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

By way of introduction, an advertising and data analysis platform may need to mine through vast amounts of data to come up with insights into advertising effectiveness, and measure and improve the effectiveness of advertising reach. This vast amount of data may be stored in a centralized data cluster, such as with HADOOP. In particular, HADOOP may be utilized for distributed processing of the vast amounts of data and the HADOOP distributed file system (HDFS) is used for organizing communications and storage of that data. Satellite clusters or nodes may be generated that also utilize HDFS. For example, a SPARK or SHARK satellite cluster may be arranged to further utilize the HDFS of the HADOOP clusters. In particular, the satellite clusters may utilize SPARK and/or SHARK with HDFS for improved access, processing, and manipulation of the large data cluster.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below.

FIG. 1 depicts a block diagram illustrating one embodiment of an exemplary network system 100. The network system 100 in FIG. 1 illustrates an exemplary system from which data analytics may be performed. Although not shown, there may be a cluster of servers for the distributed network operations that are performed using large amounts of data. FIG. 1 merely illustrates one iteration of data collection and analysis, but the analyzer may utilize a cluster of computers/servers for storing data and/or performing operations. Likewise, the data storage which is illustrated as a single database may be stored on the cluster of computers/servers. As described below, the operations performed on the data (e.g. by the analyzer) may be performed with an algorithm running from the memory of the cluster computers/servers. Likewise, the data that is analyzed is stored in the memory of the cluster computers/servers. Although FIG. 1 illustrates a database, it may be representative of a cluster of machines/servers that store data in memory (rather than on hard disk).

The network system 100 may provide a platform for analyzing advertising data (user data and ad data) and matching ads with users. In the network system 100, a user device 102 is coupled with a publisher server 106 through a network 104. The publisher server 106 may be operated by and/or coupled with a publisher 108, as well as being coupled with a publisher database 110. An advertiser server 122 coupled with an advertiser 124 may also be coupled with an advertisement database 126. An analyzer 112 may be coupled with the publisher server 106 and the advertiser server 122. The analyzer 112 may access a cluster of computers/servers (not shown) for analyzing the data as discussed below. Herein, the phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided. Accordingly, the analyzer 112 may be coupled through a network (e.g. the network 104) with the advertiser server 122. In alternative embodiments, the analyzer 112 may be a part of the advertiser server 122.

The user device 102 may be a computing device which allows a user to connect to a network 104, such as the Internet. The user may also be referred to as a consumer and accesses a product search page or a product page from an ecommerce site. The accessed page may include multiple elements for improving a user experience as well as for providing tracking information for an advertiser to target. The user device 102 may also be referred to as a client device and may include a computing device capable of sending or receiving signals, such as via a wired or a wireless network (e.g. the network 104, which may be the Internet). The user device 102 may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. The user device 102 may vary in terms of capabilities or features, particularly with regard to display size and aspect ratio. The different display sizes and aspect ratios for different user devices may result in an advertisement being rendered differently for those particular user devices. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

The user device 102 may include or may execute a variety of operating systems, including a personal computer operating system, such as a Windows, iOS or Linux, or a mobile operating system, such as iOS, Android, or Windows Mobile, or the like. The user device 102 may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. The user device 102 may also include or execute an application to communicate content, such as, for example, textual content, multimedia content, or the like. The user device 102 may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities. As described below, the user device 102 views a product search page that includes multiple functionality that may be monitored by the advertiser 124.

In one embodiment, the user device 102 is configured to request and receive information from a network (e.g. the network 104, which may be the Internet). The information may include web pages with advertisements. The user device 102 may be configured to access other data/information in addition to web pages over the network 104 using a web browser, such as INTERNET EXPLORER® (sold by Microsoft Corp., Redmond, Wash.) or FIREFOX® (provided by Mozilla). In an alternative embodiment, software programs other than web browsers may also display pages received over the network 104 or from a different source. The user data may be stored and used for matching users with ads.

In one embodiment, the publisher server 106 provides an interface to a network 104 and/or provides its web pages over the network, such as to the user device 102. The publisher server 106 may be a web server that provides the user device 102 with pages (including product search results) that are requested over the network, such as by a user of the user device 102. In particular, the publisher 108 may provide a web page, or a series of web pages that are provided by the publisher server 106 when requested from the user device 102. The publisher server 106 may be operated by a publisher 108 that maintains and oversees the operation of the publisher server 106. The publisher 108 may be any operator of a page displaying advertisements that receives a payment from the advertisers of those advertisements. In one embodiment, page may be an ecommerce page that provides products information and product search functionality. As described herein, the publisher 108 may be the entity running the data analytics and matching users with ads.

The publisher database 110 may be coupled with the publisher server 106 and may store the publisher's pages or data that is provided by the publisher server 106. The stored data may include product information as well as data analyzing the products for sale on the page. The data may be stored across a cluster of machines/servers/databases. In one embodiment, the data is stored in the memory of those devices for quicker access. The publisher pages may display one or more advertisements, such as an advertisement provided by the advertiser server 122. The advertisements may be displayed in web pages and targeted to the particular user viewing the web page. In one embodiment, the advertiser server 122 is coupled with the publisher server 106 for providing targeted ads. The advertiser 124 may be any operator of the advertiser server 122 for providing advertisements and for monitoring user interaction with the page and product search results.

The publisher server 106 and/or the advertiser server 122 may be one or more computing devices which may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In addition, the publisher server 106 and/or the advertiser server 122 may be or may be part of a content server. A content server may include a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc. A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server include desktop computers, multiprocessor systems, microprocessor-type or programmable consumer electronics, etc.

The analyzer 112 may perform data analytics for user data and ad data for matching ads to users. Because the amount of data is so large, the analytics and matching may be time-consuming. In one embodiment as discussed below, the data that is analyzed by the analyzer 112 may be stored in the memory of a cluster of servers. One example of this distributed network storage is SPARK. In one embodiment, the analyzer 112 may be controlled by the advertiser 124 and may be a part of the advertiser server 122. In another embodiment, the analyzer 112 may be controlled by the publisher 108 and may be a part of the publisher server 106. Alternatively, the analyzer 112 may be part of a separate entity. The analyzer 112 may receive elements from the advertiser server 122 and/or the publisher server 106 that are used as part of a product page or a product search result page. The analyzer 112 may be a computing device that includes a processor 120, memory 118, software 116 and an interface 114. The analyzer 112 may be a separate component from the publisher server 106 and/or the advertiser server 122, or may be combined as a single component or device. The components of the analyzer 112 are merely exemplary and in a clustered network, there may be multiple computers or components performing the functions described herein.

The interface 114 may communicate with any of the user device 102, the publisher server 106, and/or the advertiser server 122. The interface 114 may include a user interface configured to allow a user and/or administrator to interact with any of the components of the analyzer 112. For example, the administrator and/or user may be able to generate a single product page and monitor user interaction with that page.

The processor 120 in the analyzer 112 may include a central processing unit (CPU), a graphics processing unit (GPU), a digital signal processor (DSP) or other type of processing device. The processor 120 may be a component in any one of a variety of systems. For example, the processor 120 may be part of a standard personal computer or a workstation. The processor 120 may be one or more general processors, digital signal processors, application specific integrated circuits, field programmable gate arrays, servers, networks, digital circuits, analog circuits, combinations thereof, or other now known or later developed devices for analyzing and processing data. The processor 120 may operate in conjunction with a software program, such as code generated manually (i.e., programmed).

The processor 120 may be coupled with a memory 118, or the memory 118 may be a separate component. The interface 114 and/or the software 116 may be stored in the memory 118. The memory 118 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The memory 118 may include a random access memory for the processor 120. Alternatively, the memory 118 may be separate from the processor 120, such as a cache memory of a processor, the system memory, or other memory. The memory 118 may be an external storage device or database for storing recorded ad or user data. Examples include a hard drive, compact disc ("CD"), digital video disc ("DVD"), memory card, memory stick, floppy disc, universal serial bus ("USB") memory device, or any other device operative to store ad or user data. The memory 118 is operable to store instructions executable by the processor 120.

The functions, acts or tasks illustrated in the figures or described herein may be performed by the programmed processor executing the instructions stored in the memory 118. The functions, acts or tasks are independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like. The processor 120 is configured to execute the software 116. The software 116 may include instructions for generating a product page with a plurality of elements and for monitoring user interaction with that page and the elements.

The interface 114 may be a user input device or a display. The interface 114 may include a keyboard, keypad or a cursor control device, such as a mouse, or a joystick, touch screen display, remote control or any other device operative to interact with the analyzer 112. The interface 114 may include a display coupled with the processor 120 and configured to display an output from the processor 120. The display may be a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor 120, or as an interface with the software 116 for providing input parameters.

The present disclosure contemplates a computer-readable medium that includes instructions or receives and executes instructions responsive to a propagated signal, so that a device connected to a network can communicate voice, video, audio, images or any other data over a network. The interface 114 may be used to provide the instructions over the network via a communication port. The communication port may be created in software or may be a physical connection in hardware. The communication port may be configured to connect with a network, external media, display, or any other components in system 100, or combinations thereof. The connection with the network may be a physical connection, such as a wired Ethernet connection or may be established wirelessly as discussed below. Likewise, the connections with other components of the system 100 may be physical connections or may be established wirelessly. Any of the components in the network system 100 may be coupled with one another through a network, including but not limited to the network 104. For example, the analyzer 112 may be coupled with the publisher server 106 and/or the advertiser server 122 through a network. As another example, the advertiser database 126 may be coupled with the publisher server 106 and/or the analyzer 112 through a network. Accordingly, any of the components in the network system 100 may include communication ports configured to connect with a network, such as the network 104.

The network (e.g. the network 104) may couple devices so that communications may be exchanged, such as between a server and a client device or other types of devices, including between wireless devices coupled via a wireless network, for example. As described a cluster of machines storing data to be analyzed may be connected over one or more networks, such as the network 104. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

The network connecting the devices described above (e.g. the network 104) may be a "content delivery network" or a "content distribution network" (CDN). For example, the publisher server 106 and/or the advertiser server 122 may be part of a CDN. A CDN generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Likewise, the network connecting the devices described above (e.g. the network 104) may be a peer-to-peer (or P2P) network that may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server." For example, the ad server 122 or the publisher server 106 may provide advertisements and/or content to the user device 102 over a P2P network, such as the network 104.

The publisher server 106, the publisher database 110, the analyzer 112, the advertiser server 122, the advertiser database 126, and/or the user device 102 may represent computing devices of various kinds. Such computing devices may generally include any device that is configured to perform computation and that is capable of sending and receiving data communications by way of one or more wired and/or wireless communication interfaces, such as interface 114. For example, the user device 102 may be configured to execute a browser application that employs HTTP to request information, such as a web page, from the publisher server 106. The present disclosure contemplates the use of a computer-readable medium that includes instructions or receives and executes instructions responsive to a propagated signal, so that any device connected to a network can communicate voice, video, audio, images or any other data over a network.

Matching may include targeting users with relevant content. For example, relevant ads may be targeted to users. Personalized content (e.g. ads) may provide a more enjoyable user experience. As another example, search results that are responsive to the query also provide a more enjoyable user experience. Matching ads to users may maximize yield and maximize return on investment, while maintaining a positive user experience. The matching problem may include a large amount of data because of the number of users. Accordingly, solving this problem may include: 1) large amount of data (Metrics, Instrumentation); 2) Attribution; 3) Learning; 4) Econometrics (Pricing assets, Valuing outcomes); 5) Mechanism Design (Allocation of impressions to advertisers; and 6) Behavioral Sciences (Understanding users, what inspires and entertains them).

There may be different types of data. The types may include 1) structured; 2) semi-structured; and 3) unstructured. In particular, the types of data may refer to content that is displayed to a user. Structured type data may include a number of impressions sold on a front page in the last hour or page views on a particular site (e.g. FLICKR). Those are merely exemplary and there may be other examples of structured data. Semi-structured data may consider whether two sets of audience cohorts similar to each other and also consider what audience segment is most likely to be interested in a particular ad campaign. There may be an identified a segment that the advertiser should target. The third type may include unstructured data. For example, a site may consider the ways in which a new front page rollout is different than the previous front page as far as audience engagement. Likewise, the right metrics for defining user engagement are also considered.

Figure 2:
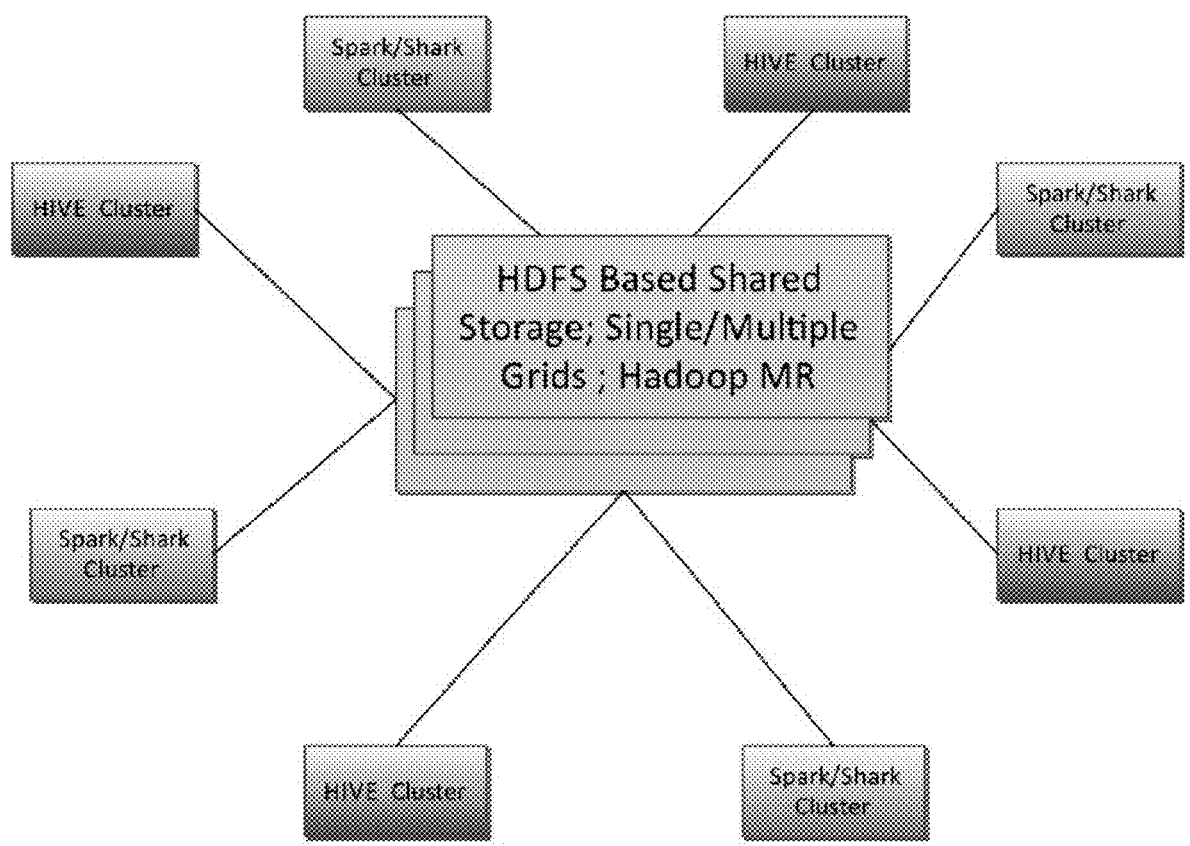
FIG. 2 is a diagram of clusters in an exemplary network system.

FIG. 2 is a diagram of clusters in an exemplary network system. FIG. 2 illustrates a HADOOP system that utilizes HADOOP distributed file system (HDFS) as shared storage between different clusters. HADOOP is open-source software designed for reliable, scalable, distributed computing. HADOOP allows for the distributed processing of large data sets across clusters of computers using simple programming models. HADOOP may scale up from single servers to thousands of machines, each offering local computation and storage. Rather than rely on hardware to deliver high-availability, the library may detect and handle failures at the application layer to provide a highly-available service on top of a cluster of computers. Accessing and organizing data in a large distributed system may be difficult and require specialized functionality for efficient operations. In one example, a map reduce engine may be provided for accessing data from the distributed HADOOP system.

FIG. 2 illustrates a centralized HADOOP system with both HIVE clusters and SPARK/SHARK clusters. HIVE is software that facilitates querying and managing large datasets residing in distributed storage. HIVE provides a mechanism to project structure onto this data and query the data using a SQL-like language called HiveQL. At the same time this language also allows traditional map/reduce programmers to plug in their custom mappers and reducers when it is inconvenient or inefficient to express this logic in HiveQL. The Hadoop MR-compute cluster may utilize the same resources as that of HDFS. The HIVE cluster may connect to the Hadoop MR cluster. The HIVE cluster may not have the same computation needs since it may be essentially a HIVE client connecting to the Hadoop MR cluster.

Further, FIG. 2 illustrates that SPARK/SHARK clusters are satellite clusters in a HADOOP distributed system. As described herein, the SPARK/SHARK satellite clusters may be implemented to utilize HDFS. By utilizing HDFS, SPARK/SHARK clusters may communicate with and/or be controlled by the distributed HADOOP system. Although the satellite clusters shown in FIG. 2 are SPARK/SHARK clusters, they may be merely SPARK clusters or SHARK clusters. SPARK is an engine that may be used for processing HADOOP data. The SPARK/SHARK clusters may reside in the same data center and connect with HDFS as a satellite cluster. It may run in HADOOP clusters, and it may process data in HDFS, HBase, Cassandra, Hive, and any Hadoop InputFormat. It may perform general data processing (similar to MapReduce) or other workloads like streaming, interactive queries, and machine learning. SPARK requires some form of shared file system (for example, NFS mounted at the same path on each node) to run. However, as described herein, the satellite clusters utilizing SPARK may run on HDFS.

In order to integrate satellite SPARK/SHARK clusters with HADOOP and HDFS, there may be functionality and operability changes that must be made. For example, the access control list (ACL) must be opened up for operability changes. SPARK and SHARK may also be patched to work with security-enabled HDFS. Finally, the SHARK cluster may be installed on GRID LAUNCHER. The integration of the satellite clusters with HDFS allows for accessing of the main data from the main data server for performing SHARK operations. The operations may be performed from the memory of the satellite SHARK cluster.

HADOOP may be used for improving database access to data. In particular, the combination of SPARK with HADOOP may improve queries of the data. For example, an advertising or analytics data warehouse may be built with HADOOP. Combining SPARK with the HADOOP data warehouse improves querying and data retrieval from that data warehouse. This may be accomplished by integrating SPARK with the HDFS.

Figure 3:
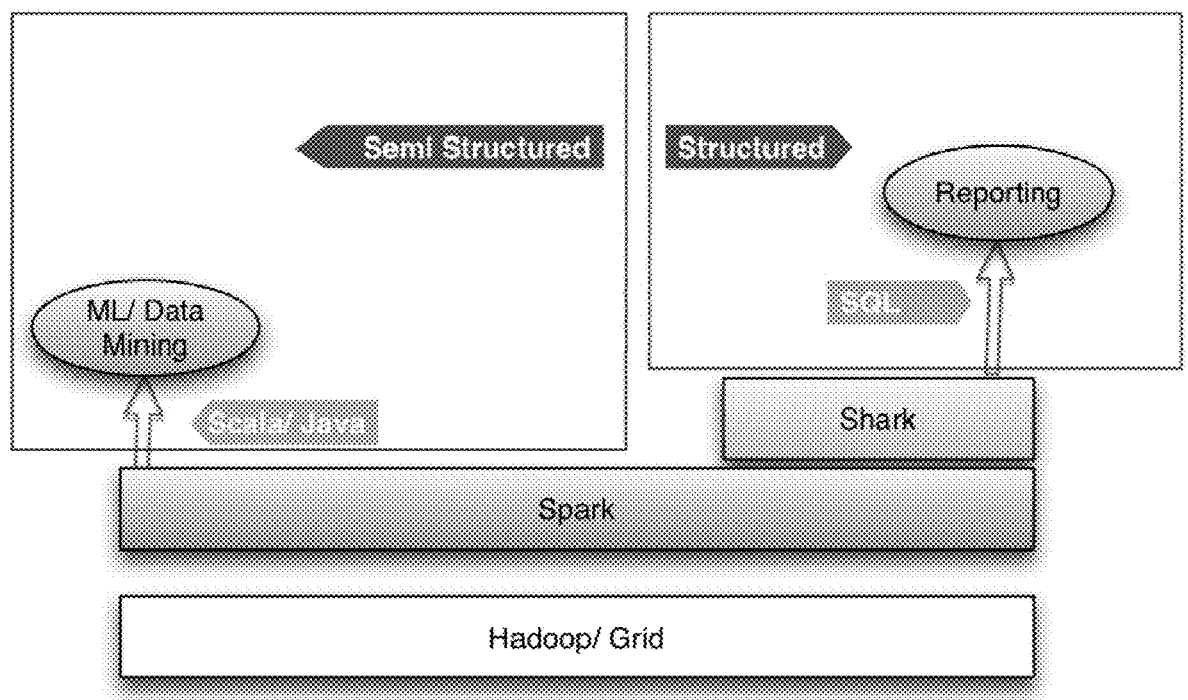
FIG. 3 is an exemplary system for data handling.
Figure 4:
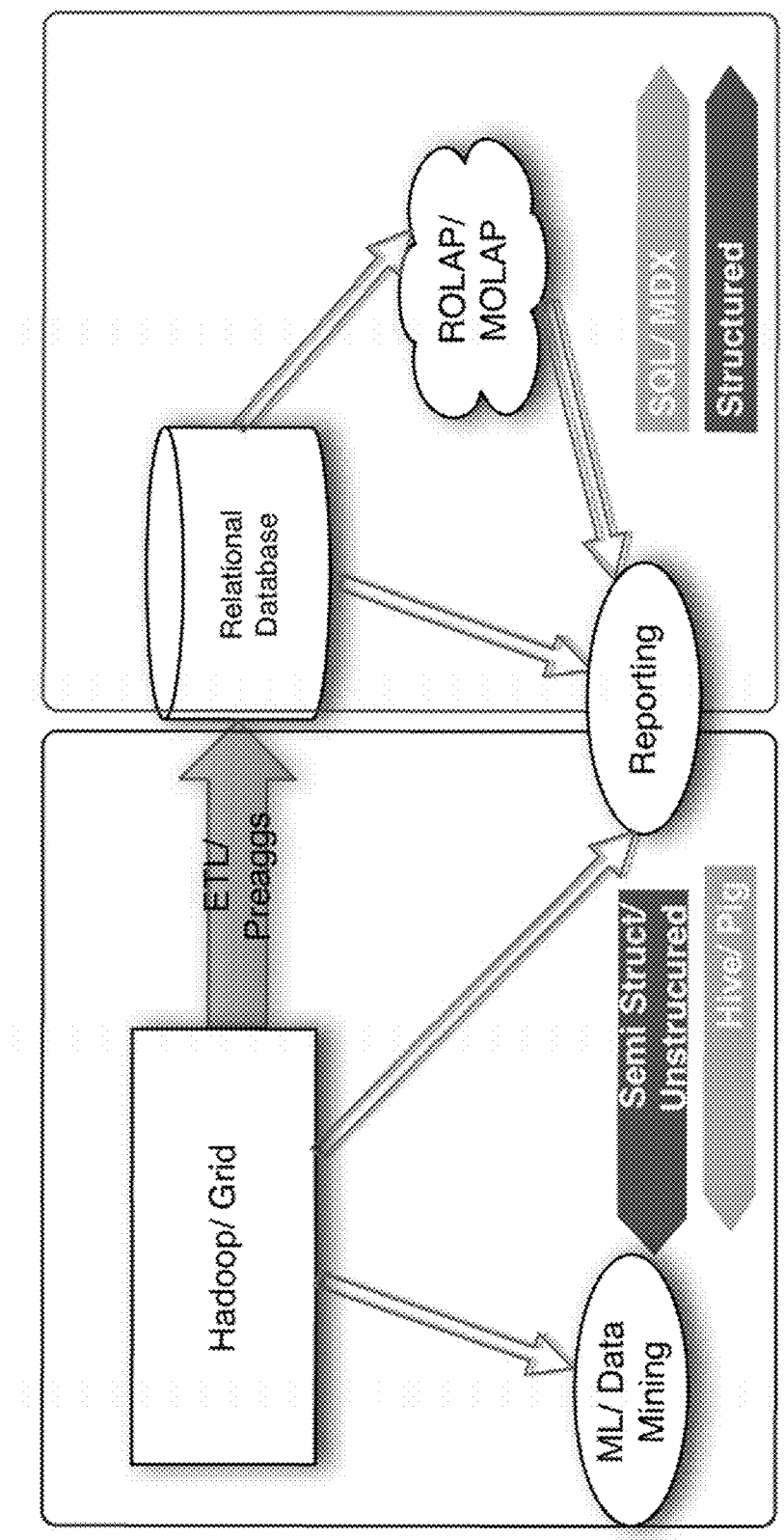
FIG. 4 is another exemplary system for data handling.

FIG. 3 is an exemplary system for data handling. FIG. 4 is another exemplary system for data handling. In particular, FIGS. 3 and 4 illustrate revised approaches for handling different types of data. For example, FIG. 4 illustrates exemplary components for handling different data types. In particular, SPARK may be used for data mining and SHARK may be used for reporting. SHARK and SPARK are exemplary systems for scaling technology at hundreds or thousands of nodes. SPARK is a data analytics cluster computing framework. In particular, SPARK utilizes in-memory cluster computing that load data into a cluster's memory. The in-memory storage of data may allow for more efficient queries and also machine learning algorithms. In other words, a distributed network of machines store both the data and run operations (for processing the data) in the memory subsystems of a cluster of servers pulled together. Other systems may pull the data from hard disks in the cluster rather than memory in the cluster. SHARK is an exemplary tool for use with SPARK that is a data warehouse infrastructure built for providing data summarization, query, and analysis. It may be considered to be a port of Apache HIVE that runs with SPARK. As described herein, Spark and Shark are exemplary of functions on a distributed network or cluster through which advertisement analytics, matching and targeting may be performed.

The exemplary analytics that may be performed may utilize SHARK. Typical problems at the event level may include overlaps (intersection/disjunction of different groups of users). Accordingly, overlaps may be computed efficiently. Approximations may be used include hashing based approximations including min hashing and mod hashing. For an exact analysis, all portions may be computed in one pass.

Deployment of this analytics system (e.g. as shown in FIG. 3) may include various features including:
Satellite clusters;
No HDFS locally;
No need to worry about maintenance of HDFS;
Sampled data set loaded into memory for performance, on disk queries can run on full data set; and
50 node*96 GB RAM boxes, with compression currently loading about 1.6 TB into memory (>3.2 TB without compression).

The exemplary SHARK server may include multitenant access to SHARK. It may be threadsafe and use Thrift APIs to allow interop. For map split pruning, SHARK may use statistics to prune partitions so jobs do not need to be launched for splits that do not contain the desired data. A bloom filter based pruner may be added for high cardinality columns. For column pruning, there may be a feature to SHARK that prunes columns that are not selected in a query so the iterator advancement for those columns is not required. This may provide an improvement in performance when the total number of columns>>number selected (typical in OLAP). For map join, the map join implementation may allow streaming though larger tables against a hash table created from the smaller. Usage: select/*+ MapJoin (smaller)*/smaller.clicks, . . . from smaller join larger on ( . . . ). By default Map Join may be turned off.

Compression techniques may be necessary to squeeze more data into memory. Direct access to compressed data may be needed during query execution. Compression algorithms may include Null bit vectors and Run Length Encoding. It may be enabled by default—INT, SHORT, BYTE, BOOLEAN, STRING. Using may be disabled: set shark.column.compress=false; CREATE TABLE test_cached AS SELECT*FROM test. The amount of compression achieved may depend on properties of data. For example, there may be a compression of 3-20x compared to SHARK-0.7 for large data sets. Other compression algorithms may be used depending on the types of data.

Additional features of the system may include usability improvements, including the ability to autodetect # of reducers etc, and come up with sensible defaults. For example, better join choices based on statistics (e.g. turn on map join). Self join performance may be improved by collecting required information in one pass of the table. Disk performance may also be improved. Partition support may be dropped to allow moving window caches. There may also be a feature to expose SPARK resilient distributed datasets (RDDs) as Tables in SHARK which may eliminate writing UDAFs etc.

Figure 5:
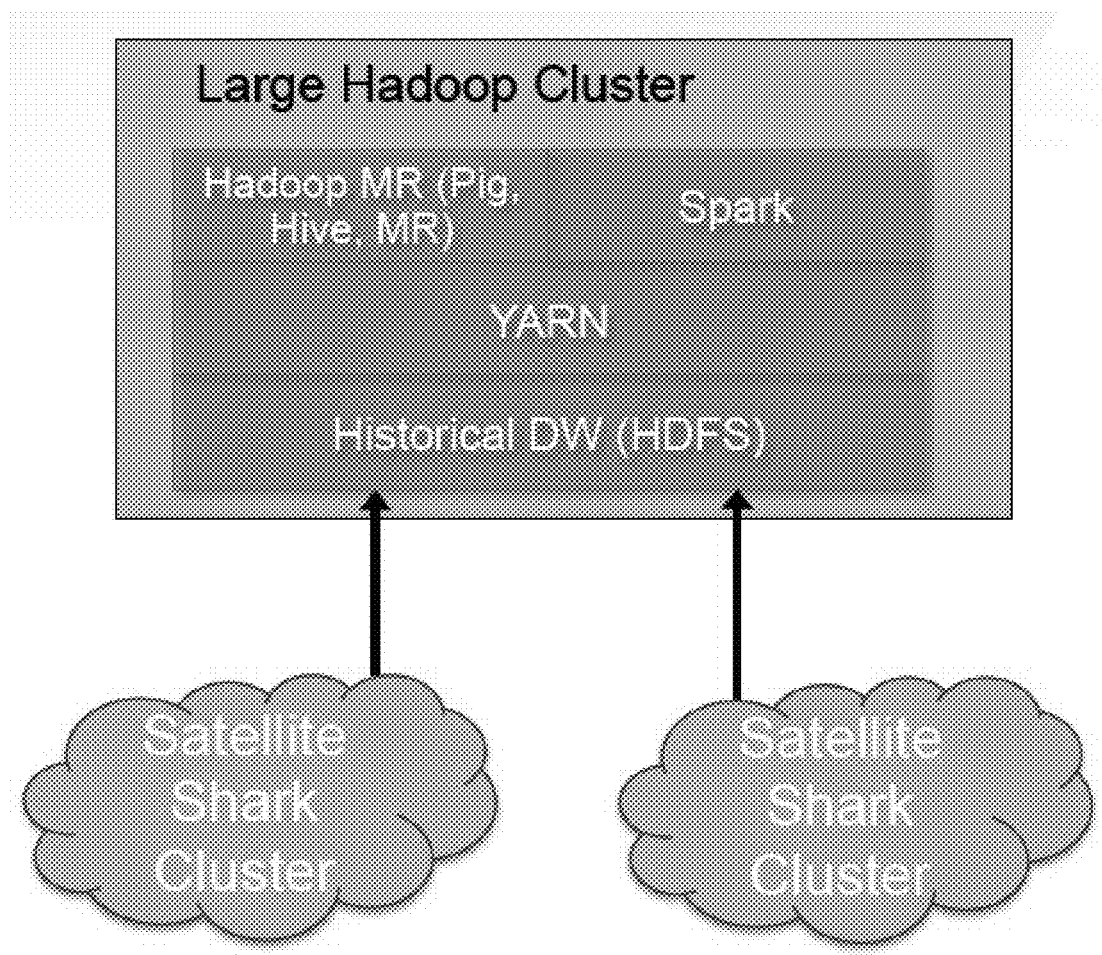
FIG. 5 is a diagram of clusters in another exemplary network system.

FIG. 5 is a diagram of clusters in another exemplary network system. FIG. 5 further illustrates the satellite deployment of a SHARK cluster by showing two satellite SHARK clusters that communicate with the (centralized) large HADOOP cluster. In particular, the satellite SHARK clusters utilize the HDFS of the large HADOOP cluster. Functions or components within the large HADOOP cluster in this embodiment may include YARN, SPARK, and/or MapReduce (MR) functions.

As described, satellite SHARK and/or SPARK clusters may utilize HDFS within a centralized data cluster. In other words, the satellite clusters are modified to utilize the same distributed file system as the other clusters. This implementation may be part of Apache Hadoop Yet Another Resource Negotiator ("YARN"), which is a feature for HADOOP that includes cluster management technology. In particular, YARN may be one commercial implementation of the integration of SHARK and/or SPARK clusters with HDFS. Generally, YARN may be considered to be a distributed operating system for big data applications and may be a replacement for MapReduce and is sometimes referred to as MapReduce 2.0. YARN removes resource management and scheduling capabilities from the data processing component, which may enable HADOOP to support more varied processing approaches and a broader array of applications. HADOOP clusters may run interactive querying and streaming data applications simultaneously with MapReduce batch jobs. The original incarnation of HADOOP combined the Hadoop Distributed File System ("HDFS") with the batch-oriented MapReduce programming framework, which handles resource management and job scheduling on HADOOP systems and supports the parsing and condensing of data sets in parallel. Separating HDFS from MapReduce with YARN makes the HADOOP environment more suitable for operational applications that can't wait for batch jobs to finish. SPARK can run on Hadoop 2's YARN cluster manager, and can read existing HADOOP data.

Figure 6:
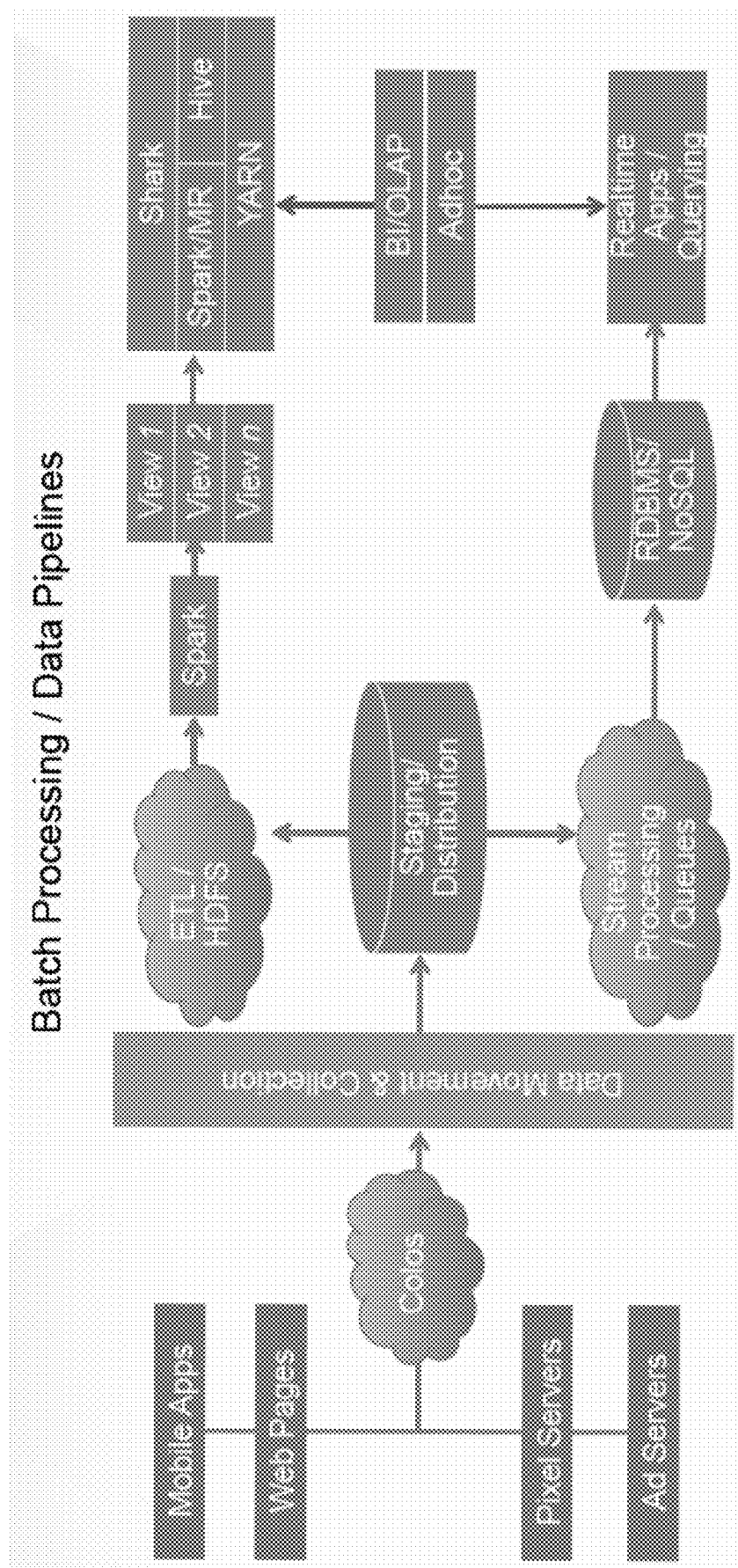
FIG. 6 is a diagram of batch processing and data pipelines.

FIG. 6 is a diagram of batch processing and data pipelines. FIG. 6 illustrates the movement of data from end users (e.g. mobile apps or web pages) and server providers (ad servers or pixel servers) through Data Movement & Collection to Staging/Distribution. The staging/distribution may be a data warehouse that stores large quantities of data, such as advertising and/or user profile information. There may be realtime stream processing of the data through realtime apps. The batch processing of the collected data may be utilizing a large cluster (e.g. HADOOP as described above). The distributed file system may allow for various functions/ operations for accessing/interacting with the data (e.g. HIVE, Mapreduce, YARN, etc.). When SPARK is modified to utilize the HDFS, it SPARK may be used for accessing data.

SPARK may solve the need for interactive data processing at REPL and SQL levels. In-memory data persistence may be achieved due to continual decreasing cost of RAM and SSD's. There may be collections API with high familiarity for Scala. The use of SPARK with HADOOP allows developers not to be restricted by rigid HADOOP MapReduce paradigm. This system provides a storage solution in HDFS while providing a more optimal processing layer and/or data manipulation.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

What is claimed is:

1. A distributed computing system comprising:
at least one processor; and
memory, wherein the memory comprises instructions that when executed by the at least one processor implement at least some of:
a map reduce engine;
a distributed file system for a multi-node centralized cluster; and
a plurality of satellite clusters coupled to the multi-node centralized cluster via one or more network connections and configured to use the distributed file system of the multi-node centralized cluster, wherein:
a first satellite cluster of the plurality of satellite clusters is integrated with the distributed file system of the multi-node centralized cluster and performs data mining of first data stored using the distributed file system of the multi-node centralized cluster, and
a second satellite cluster of the plurality of satellite clusters is integrated with the distributed file system of the multi-node centralized cluster and performs reporting of second data stored using the distributed file system of the multi-node centralized cluster.

2. The distributed computing system of claim 1, wherein at least one satellite cluster of the plurality of satellite clusters loads data provided from the multi-node centralized cluster into second memory associated with the at least one satellite cluster.

3. The distributed computing system of claim 1, wherein the first satellite cluster performs querying and data retrieval from a data warehouse using the distributed file system of the multi-node centralized cluster.

4. The distributed computing system of claim 1, wherein the map reduce engine receives a query.

5. The distributed computing system of claim 4, wherein the map reduce engine accesses a data set associated with the query.

6. The distributed computing system of claim 5, wherein the map reduce engine prunes one or more columns of data within the data set to create a pruned data set.

7. The distributed computing system of claim 6, wherein the one or more columns of data are not selected in the query.

8. A computer network system comprising:
at least one processor; and
memory, wherein the memory comprises instructions that when executed by the at least one processor implement:
a plurality of satellite clusters coupled to a multi-node centralized cluster via one or more network connections and configured to use a distributed file system of the multi-node centralized cluster;
wherein the multi-node centralized cluster comprises the distributed file system for the multi-node centralized cluster; and
wherein at least one of:
a first satellite cluster of the plurality of satellite clusters is integrated with the distributed file system of the multi-node centralized cluster and performs data mining of first data stored using the distributed file system of the multi-node centralized cluster; or
a second satellite cluster of the plurality of satellite clusters is integrated with the distributed file system of the multi-node centralized cluster and performs reporting of second data stored using the distributed file system of the multi-node centralized cluster.

9. The computer network system of claim 8, wherein at least one of the first satellite cluster or the second satellite cluster is controlled by the distributed file system.

10. The computer network system of claim 8, wherein at least one of the first satellite cluster or the second satellite cluster does not comprise a local distributed file system.

11. The computer network system of claim 8, wherein a map reduce engine is configured to execute functions on a subset of the multi-node centralized cluster.

12. The computer network system of claim 11, wherein the map reduce engine:
   receives a query;
   accesses a data set associated with the query; and
   prunes one or more columns of data within the data set that are not selected in the query to create a pruned data set.

13. The computer network system of claim 8, wherein at least one satellite cluster of the plurality of satellite clusters receives instructions for controlling operations of the at least one satellite cluster from the multi-node centralized cluster.

14. The computer network system of claim 8, wherein:
   at least one satellite cluster of the plurality of satellite clusters is patched to work with security of the distributed file system, and
   an access control list of the at least one satellite cluster is opened up for access.

15. A network system comprising:
   at least one processor; and
   memory, wherein the memory comprises instructions that when executed by the at least one processor implement:
      a multi-node centralized cluster comprising a distributed file system for the multi-node centralized cluster;
      wherein a plurality of satellite clusters are coupled to the multi-node centralized cluster via one or more network connections and are configured to use the distributed file system of the multi-node centralized cluster;
   wherein at least one of:
      a first satellite cluster of the plurality of satellite clusters is integrated with the distributed file system of the multi-node centralized cluster and performs data mining of first data stored using the distributed file system of the multi-node centralized cluster; or
      a second satellite cluster of the plurality of satellite clusters is integrated with the distributed file system of the multi-node centralized cluster and performs reporting of second data stored using the distributed file system of the multi-node centralized cluster.

16. The network system of claim 15, wherein the first satellite cluster of the plurality of satellite clusters is integrated with the distributed file system of the multi-node centralized cluster and performs the data mining of the first data stored using the distributed file system of the multi-node centralized cluster.

17. The network system of claim 15, wherein the second satellite cluster of the plurality of satellite clusters is integrated with the distributed file system of the multi-node centralized cluster and performs the reporting of the second data stored using the distributed file system of the multi-node centralized cluster.

18. The network system of claim 15, wherein the multi-node centralized cluster controls at least one of the first satellite cluster or the second satellite cluster.

19. The network system of claim 15, wherein the multi-node centralized cluster controls the first satellite cluster.

20. The network system of claim 15, wherein the multi-node centralized cluster controls the second satellite cluster.

* * * * *